(12) United States Patent
Wiener et al.

(10) Patent No.: US 9,128,984 B2
(45) Date of Patent: ***Sep. 8, 2015

(54) QUERY PLAN ANALYSIS OF ALTERNATIVE PLANS USING ROBUSTNESS MAPPING

(75) Inventors: Janet L. Wiener, Palo Alto, CA (US); Goetz Graefe, Madison, WI (US); Harumi Kuno, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1676 days.

This patent is subject to a terminal disclaimer.

(21) Appl. No.: 12/364,107

(22) Filed: Feb. 2, 2009

(65) Prior Publication Data

US 2010/0198811 A1     Aug. 5, 2010

(51) Int. Cl.
   *G06F 7/00*     (2006.01)
   *G06F 17/30*    (2006.01)

(52) U.S. Cl.
   CPC .... *G06F 17/30463* (2013.01); *G06F 17/30474* (2013.01)

(58) Field of Classification Search
   CPC ............... G06F 17/30463; G06F 17/30474; G06F 17/30864
   USPC ........................ 707/713, 715, 718, 719, 721
   See application file for complete search history.

(56) References Cited

U.S. PATENT DOCUMENTS

| | | | |
|---|---|---|---|
| 7,840,556 B1 * | 11/2010 | Dayal et al. | 707/721 |
| 2003/0177137 A1 | 9/2003 | MacLeod et al. | |
| 2005/0222965 A1 | 10/2005 | Chaudhuri et al. | |
| 2006/0190310 A1 | 8/2006 | Gudla et al. | |
| 2006/0200451 A1 | 9/2006 | Kosuru et al. | |
| 2007/0143246 A1 | 6/2007 | Bestgen et al. | |

\* cited by examiner

*Primary Examiner* — Taelor Kim
*Assistant Examiner* — Berhanu Mitiku
(74) *Attorney, Agent, or Firm* — International IP Law Group, PLLC

(57) ABSTRACT

Computer-implemented and associated operating methods evaluate robustness of a query plan by measuring performance with regard to a range of runtime conditions and producing a map of relative performance of the given query plan when compared with alternative plans for a range of conditions. The computer-implemented system comprises logic that evaluates the selected query plan in comparison to multiple alternative query plans in a predetermined range of runtime conditions that include data characteristics. The logic produces a set of performance measurements and analyzes the measured performance to map performance of the selected query plan in comparison to performance of one or more alternative query plans.

4 Claims, 19 Drawing Sheets

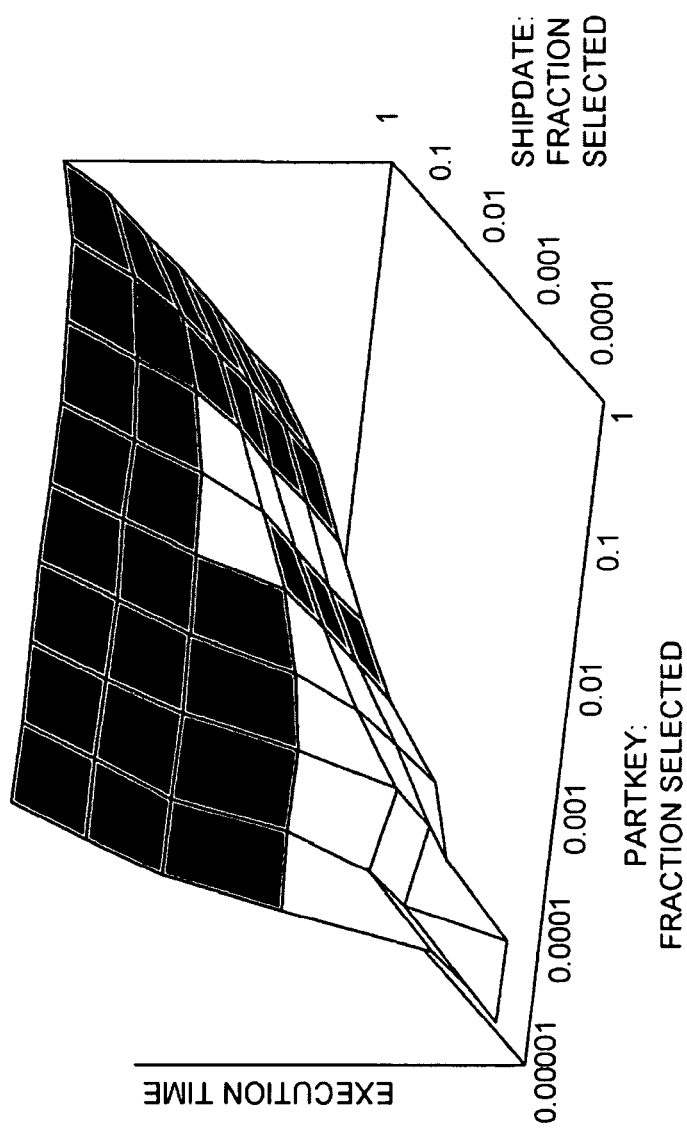

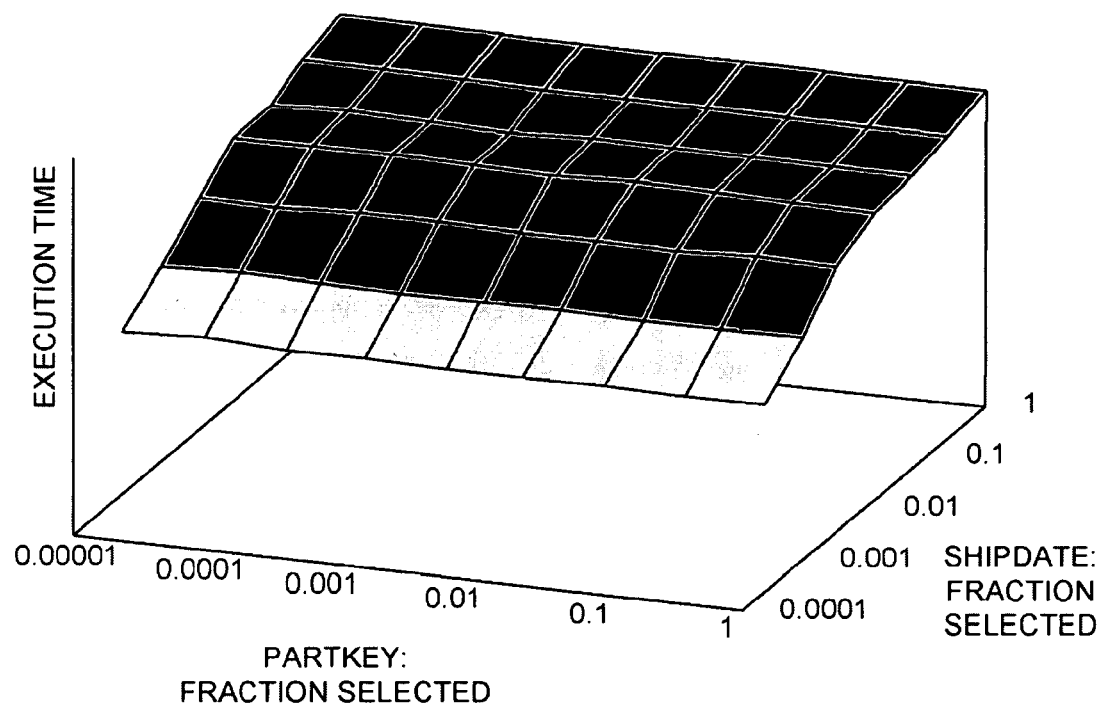
FIG. 4L(1)
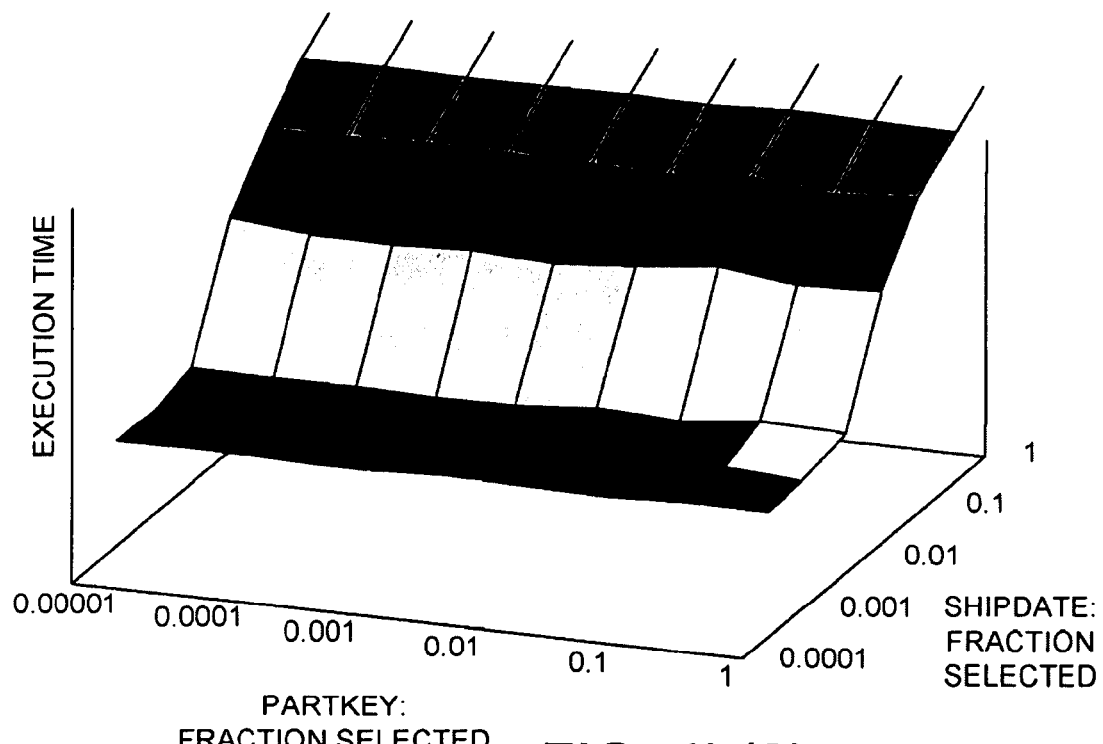
FIG. 4L(2)

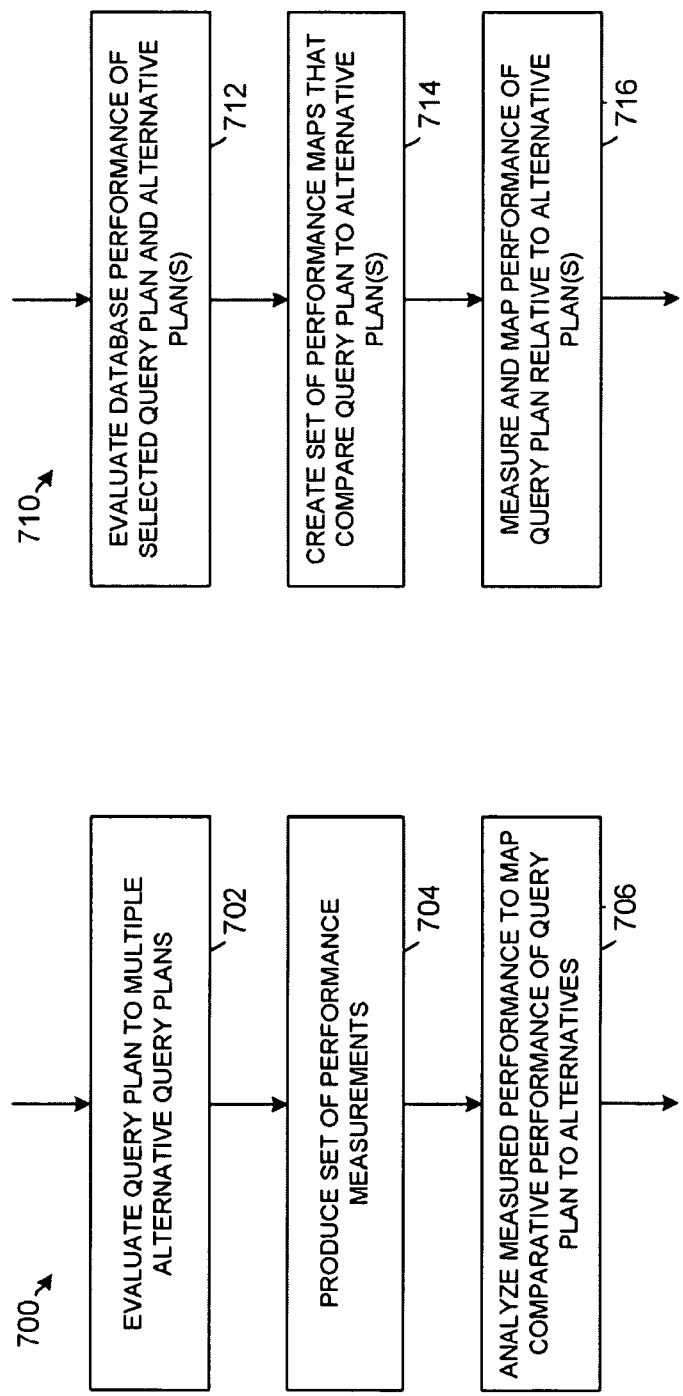

US 9,128,984 B2

QUERY PLAN ANALYSIS OF ALTERNATIVE PLANS USING ROBUSTNESS MAPPING

BACKGROUND

A query statement can be compiled into a query plan consisting of query operators. A query operator can be executed in many different ways, for example full table scans, index scans, nested loop joins, hash joins, and others. A query optimizer is a component of a database management system that attempts to determine the most efficient way to execute a query. The query optimizer determines the most efficient way to execute a SQL statement after considering many factors related to the objects referenced and the conditions specified in the query. The determination is a useful step in the processing of any query statement and can greatly affect execution time.

The query optimizer compares the available query plans for a target input query and estimates which of plan will be the most efficient in practice. One type of query optimizer operates on a cost basis and assigns an estimated cost to each possible query plan, for example selecting the plan with the smallest cost. Costs can be used to estimate the runtime cost of evaluating the query in terms of factors such as the number of I/O operations required, processor load requirements, and other factors which can be set forth in a data structure called a data dictionary which stores statistics used by the query optimizer. The set of available query plans that are examined is formed by examining the possible access paths, such as index scan and sequential scan, and join algorithms including sort-merge join, hash join, nested loops, and others. A search space can become very large according to complexity of the query.

Performance of a database system during processing of a query depends on the ability of a query optimizer to select an appropriate plan for executing the query under an expected set of conditions (for example, cardinality estimates, resource availability assumptions), and the ability of an executor to process the query using the selected plan under actual runtime conditions.

Some approaches to managing database system performance focus on the query optimizer's ability to select an appropriate plan. Even techniques that consider the disparity between expected and actual runtime conditions focus on assisting the query optimizer to pick the best plan with regard to such disparity.

SUMMARY

Embodiments of computer-implemented systems and associated operating methods evaluate robustness of a query plan by measuring performance with regard to a range of runtime conditions and producing a map of relative performance of the given query plan when compared with alternative plans for a range of conditions. The computer-implemented system comprises logic that evaluates the selected query plan in comparison to multiple alternative query plans in a predetermined range of runtime conditions that include data characteristics. The logic produces a set of performance measurements and analyzes the measured performance to map performance of the selected query plan in comparison to performance of an alternative query plan.

BRIEF DESCRIPTION OF THE DRAWINGS

Embodiments of the invention relating to both structure and method of operation may best be understood by referring to the following description and accompanying drawings:

FIGS. 7A and 7B are flow charts showing one or more embodiments or aspects of a computer-executed method for evaluating robustness of a query plan by measuring performance with regard to a range of runtime conditions and producing a map of relative performance of the given query plan when compared with alternative plans for a range of conditions.

DETAILED DESCRIPTION

A map compares a query plan to alternative plans. A system creates the map, which compares a target query plan to alternatives under specific runtime conditions.

Systems and operating methods disclosed herein use evaluation of robustness of a given query plan to produce a map of the relative performance of the given query plan when compared with alternative plans for a range of conditions.

Robustness of the query plan can be evaluated by measuring performance with regard to a range of runtime conditions including resource availability and data characteristics. Evaluation of query plan robustness enables production of a set of measurements that can be displayed as a set of one or more maps. The measurements can be analyzed to identify landmarks, which are defined as features on the maps indicating regions where performance of a given database query plan degrades less than gracefully.

The depicted systems and operating methods create maps which compare a target query plan to alternatives under specific runtime conditions. In contrast, conventional approaches typically manage database system performance by focusing on a query optimizer's ability to select an appropriate plan—a compile-time operation. Even conventional techniques that consider the disparity between expected and actual runtime conditions focus on helping the query optimizer pick the best plan with regard to the disparity.

The systems and techniques disclosed herein explicitly evaluate performance under a wide variety of runtime conditions, thereby enabling production of a map that can be used to "look up" the probable performance of a database query plan under a specific set of actual runtime conditions. The map that can be analyzed to evaluate continuity of the performance of a database query using a specific query plan under progressively adverse conditions. For example, while a traditional regression test can be used to identify points at which performance degrades, the map created by the illustrative systems and techniques can be used to identify patterns of points at which performance degrades unnaturally.

The illustrative systems and techniques enable production and usage of a set of maps to rationalize the complex factors and interactions that determine the performance of a database system.

Figure 1:
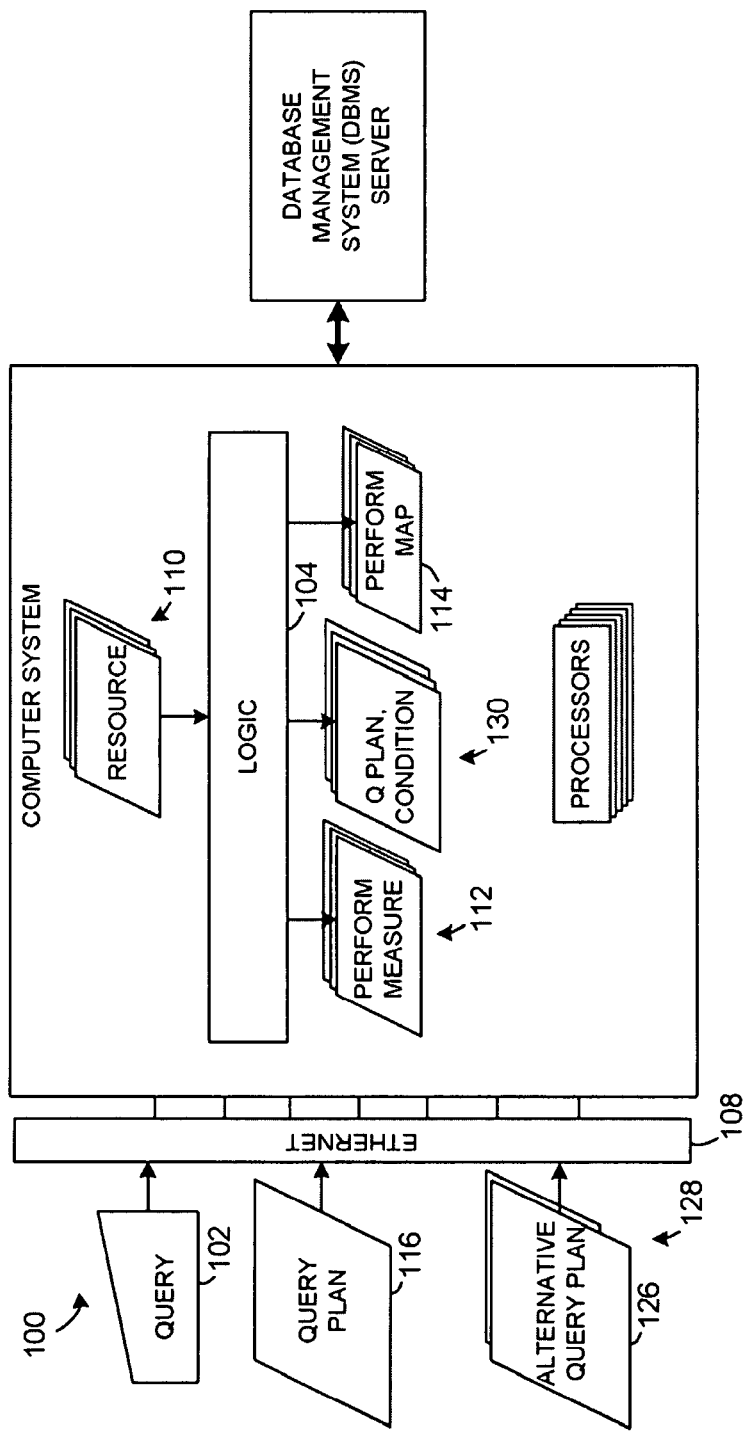
FIG. 1 is a schematic block diagram showing an embodiment of a computer-implemented system that evaluates robustness of a query plan by measuring performance with regard to a range of runtime conditions and produces a map of relative performance of the given query plan when compared with alternative plans.

Referring to FIG. 1, a schematic block diagram illustrates an embodiment of a computer-implemented system 100 that evaluates robustness of a query plan 116 by measuring performance with regard to a range of runtime conditions and produces a map 114 of relative performance of the given query plan 116 when compared with alternative plans 126 for a range of conditions. The computer-implemented system 100 comprises logic 104 that evaluates the selected query plan 116 in comparison to multiple alternative query plans 126 in a predetermined range of runtime conditions that include data characteristics and/or other conditions such as resource availability and others. The logic 104 produces a set 112 of performance measurements and analyzes the measured performance to map performance of the selected query plan in comparison to performance of one or more alternative query plans 126.

The logic 104 can identify landmarks indicative of selected query plan performance that is degraded greater than a selected amount in comparison to alternative query plan performance.

In some implementations or applications, the logic 104 can generate a marked performance map 114 wherein the marking is indicative of performance of the selected query plan 116 in comparison to alternatives under runtime conditions. For example, the marking can be color-coding or grayscale shade coding wherein the color or shade can indicate performance. In other examples, any type of coding can be used to convey performance information.

In another example implementation or application, the logic 104 can generate a marked performance map 114 wherein the marking is indicative of performance of the selected query plan in comparison to alternatives under predetermined average processor load conditions during query execution.

In a further example, the logic 104 can generate a marked performance map 114 wherein the marking is indicative of regions wherein the selected query plan degrades a predetermined amount when compared to a best alternative.

In an example embodiment, the system 100 can comprise a query 102 to be evaluated, a selected query plan 116, and a set 110 of runtime resource conditions under which the query is to be evaluated. The logic 104 generates a plurality of alternative query plans 126 for the query 102 to be evaluated under the runtime resource conditions in a set 128 of alternative query plans.

The logic executes the query 102 to be evaluated using the multiple alternative query plans 126 and the multiple resource conditions 110 which form a query plan/resource condition coordinate set 130. The logic 104 compares performance of the selected query plan 116 to performance of a best performing query plan of the plurality of query plans for each coordinate set 130 and generates a performance map 114 which indicates comparison of the selected query plan 116 to the best performing of the alternative query plans 126

The system 100 can further comprise an interface 108 for receiving a query 102, a target query plan 116, and a set 110 of runtime resource conditions to be evaluated. The logic 104 can generate and collect alternative query plans 126 for the query 102 by iterating through the runtime conditions and, for sets 110 of runtime conditions, iterating through the target query plan 116 and alternative query plans 126. While iterating through the runtime conditions, the logic 104 can run the query 102 under the specified conditions while collecting alternative query plans 126 which are generated by a query optimizer 126. The logic 104 then measures and collects performance results of the query runs.

For selected sets of conditions, the logic 104 can compare performance of the target query plan 116 to performance of a determined best alternative query plan for the selected conditions.

Figure 2:
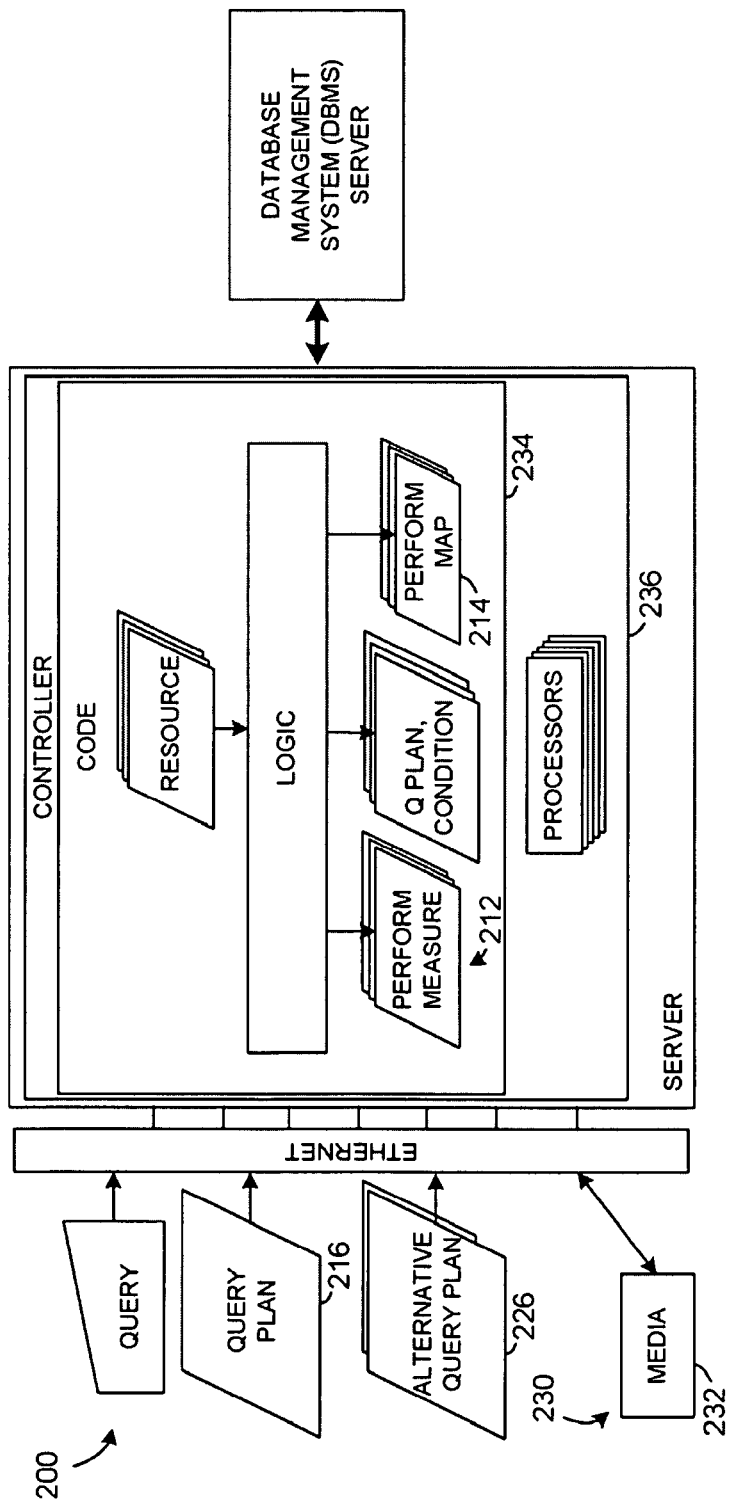
FIG. 2 is a schematic block diagram depicting an embodiment of a computer-implemented system in the form of an article of manufacture that evaluates robustness of a query plan by measuring performance with regard to a range of runtime conditions and produces a map of relative performance of the given query plan when compared with alternative plans.

Referring to FIG. 2, a schematic block diagram illustrates an embodiment of a computer-implemented system 200 in the form of an article of manufacture 230 that evaluates robustness of a query plan 216 by measuring performance with regard to a range of runtime conditions and produces a map 214 of relative performance of the given query plan when compared with alternative plans. The article of manufacture 230 comprises a controller-usable medium 232 having a computer readable program code 234 embodied in a controller 236 for evaluating a selected query plan 216 in comparison to a plurality of alternative query plans 226. The computer readable program code 234 comprises code causing the controller 236 to evaluate the selected query plan 216 in comparison to the plurality of alternative query plans 226 in a predetermined range of runtime conditions that include data characteristics, and to produce a set 212 of performance measurements and analyze the measured performance. The computer readable program code 234 further comprises code causing the controller 236 to map performance of the selected query plan 216 in comparison to an alternative query plan performance.

Figure 3:
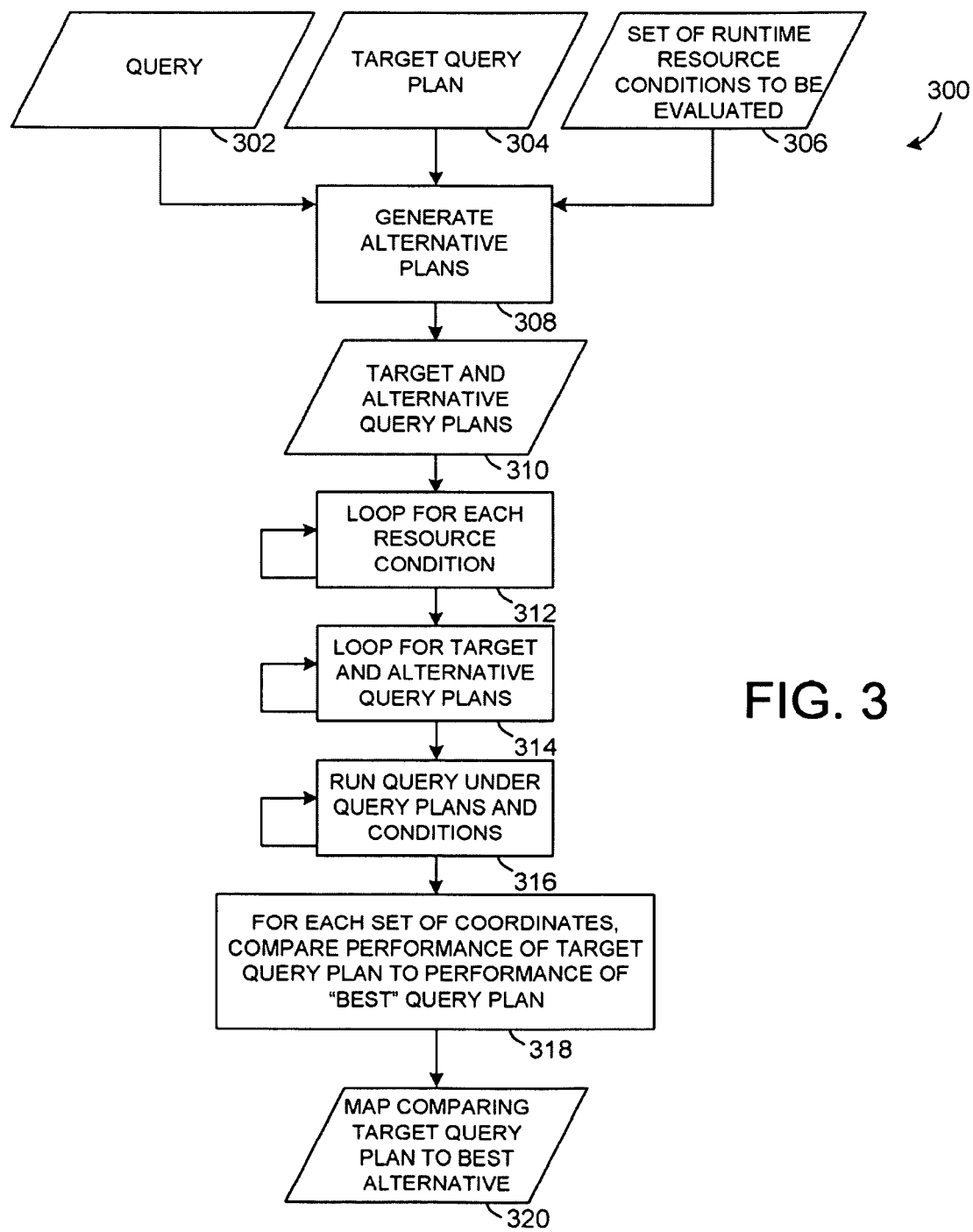
FIG. 3 is a schematic flow chart illustrating an embodiment of method for creating a map of potential query plan coverage compared with alternative plans with regard to performance.

Referring to FIG. 3, a schematic flow chart illustrates an embodiment of method 300 for creating a map of potential query plan coverage compared with alternative plans with regard to performance. FIG. 3 sketches an example embodiment of a system and method 300 that receive input items in the form of a query 302, a target query plan 304, and a set 306 of runtime resource conditions to be evaluated. Alternative query plans for the query under the various runtime conditions are generated and collected 308. Target and alternative query plans can be stored 310. The method 300 further comprises iteration 312 through the runtime conditions and, for each set of conditions, iterating 314 through the target and alternative query plans, while running 316 the query under the specified conditions and forcing the query plan. For example, the query can be run 316 under the specified conditions including actual resource availability and cardinality conditions. Performance results of the runs are measured and collected. For each set of conditions, performance of the target query plan can be compared 318 to that of the "best" query plan for the particular conditions, and add that information to the output map. The map comparing the target query plan to the performance of the best alternative can be stored 320. Simple example maps are shown in FIGS. 4A, 4B, and 4C.

Figure 4A:
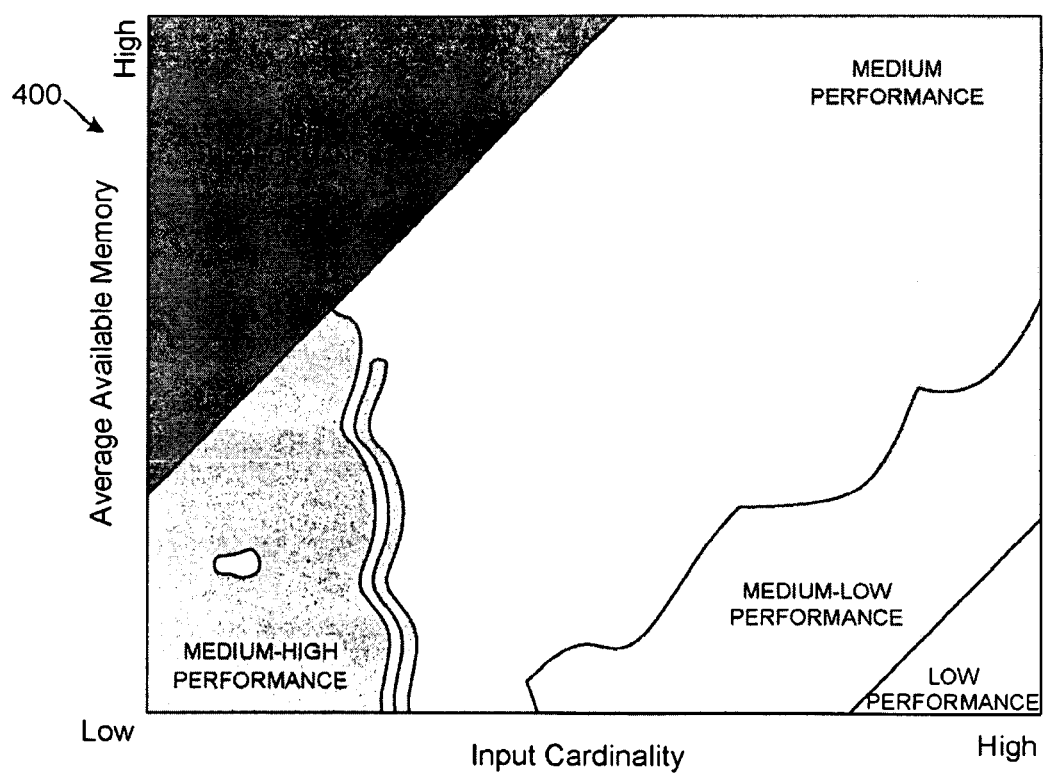
FIGS. 4A through 4N are pictorial diagrams showing maps of performance under specific runtime conditions.
Figure 4B:
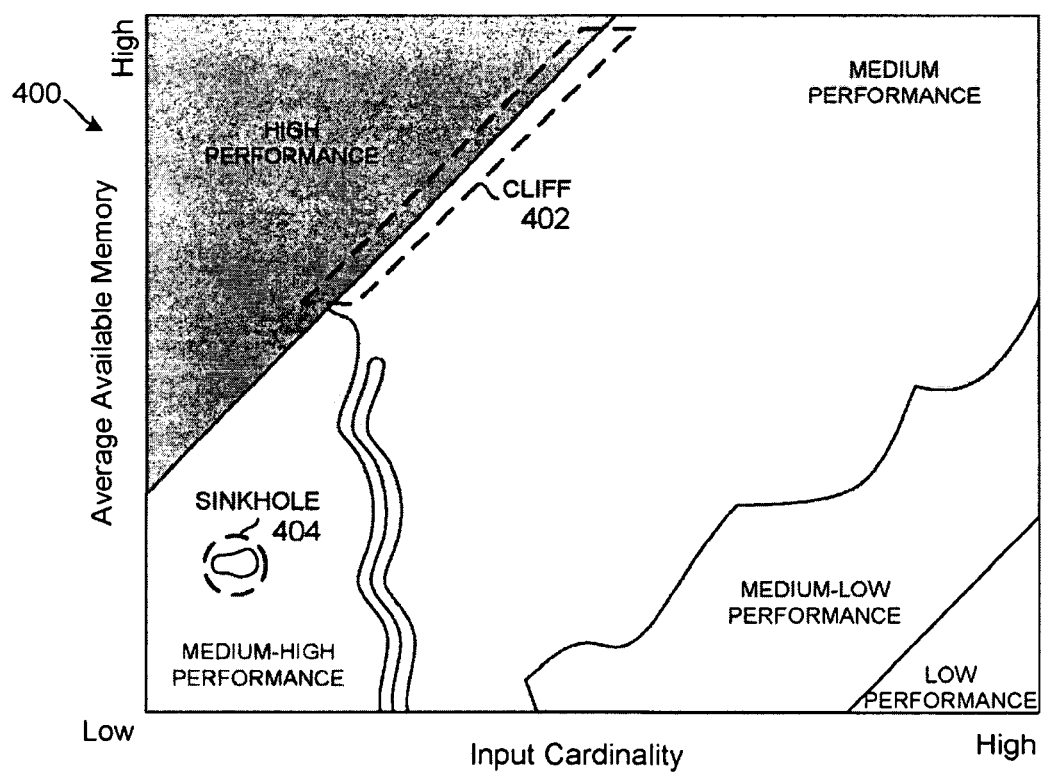

FIG. 4A shows a hypothetical map of performance under specific runtime conditions for a database operator, for example a database scan operation. The X axis is the number of rows processed by the scan operator (cardinality). The Y axis represents the average amount of memory available to the scan operator during execution. Regions of the map are color-coded or grayscale coded according to average throughput under their particular available memory/input cardinality conditions. Darker colors indicate higher throughput.

"Robustness" is defined herein as a measure of continuity of the curvature of the function describing performance under varying conditions. FIG. 4B shows how "interesting features" can be marked on the map 400. In an example application, areas of interest such as edges and holes where the target query plan's performance drops off precipitously when compared to the best alternative. Thus, where performance does not degrade gracefully. For example, the circled area labeled "cliff" 402 mark a long edge. The map 400 can accommodate any number of other types of features.

Figure 4C:
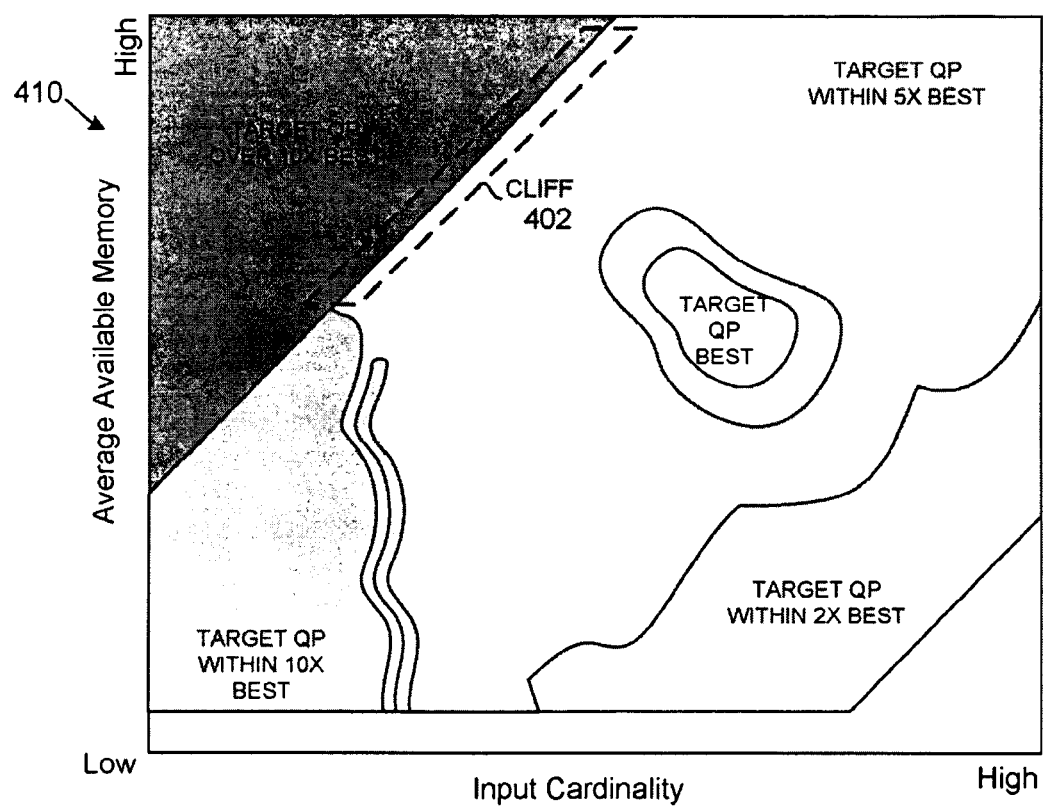

Referring to FIG. 4C, a pictorial diagram shows a hypothetical map 410 comparing a target query plan to alternatives under specific runtime conditions. The X axis shows the number of rows of input that are processed during execution (cardinality). The Y axis represents the maximum amount of memory available to the executor for the subject query during execution. Regions of the map can be color-coded or gray-scale-coded according to results of comparison of the target query plan to alternatives under particular available memory/input tuples processed conditions. Darker colors indicate that the query plan compares less favorably to alternatives. A similar graph can be created for conditions such as average CPU load average during the execution of the query or other parameters. Multiple graphs can be combined to compare performance under multiple conditions, for example including aspects of one or more of cardinality, memory availability, CPU load average, average disk busy, and the like. Any number of other visualization techniques can be applied to capture the information. For example, the map can be annotated to mark a region of anticipated conditions under which the query is expected to execute.

Considering that performance of a database system during processing of a query depends on the ability of a query optimizer to select an appropriate plan for executing the query under an expected set of conditions and the ability of an executor to process the query using the selected plan under actual runtime conditions, a challenge arises that actual runtime conditions can differ significantly from what is expected, particularly in situations where multiple queries execute simultaneously. For example, data skew can cause cardinality to exceed expectations by multiple orders of magnitude, or an unexpectedly heavyweight query can monopolize memory, leaving only a fraction of expected memory available. In a worst case, actual runtime conditions can be so adverse that the selected query plan can potentially be the worst, as opposed to the best, plan for the given conditions.

In addition, database operator implementations are typically tested to verify performance at specific points, as opposed to tested in terms of the continuity of performance degradation over a large range of conditions. Thus, performance can suddenly degrade dramatically and unexpectedly with only a minor change in conditions. Accordingly, the system 100 depicted in FIG. 1 and associated functionality, by creating a map of performance under a large range of conditions, enables the prediction and analysis of such performance degradation.

In contrast to the illustrative system 100, traditional solutions do not consider the impact of variable runtime conditions, such as resource availability, and do not systematically gather actual performance measurements over a variety of runtime conditions. Furthermore, traditional solutions focus on the selection of optimal query plans for a small range expected conditions, as opposed to the evaluation of database operators under a wide variety of actual conditions.

For example, Harista et al. (U.S. Publication No. 2002/0046030) discloses a system that maps how well queries perform relative to one another in terms of estimated (expected) performance in ranges of the selectivity of a simple single-operator query with up to two parameters. Because the goal in Harista et al. is to reduce the number of plans in the query optimizer's plan search space, actual performance is not modeled and the impact of other conditions such as resource availability is not considered.

Database regression tests may test the performance of individual operators, sometimes under specific resource availability conditions, but do not evaluate performance across a spectrum of conditions and do not consider performance as a continuous function across a spectrum of conditions. Database regression tests are used to evaluate performance—results are not stored nor later used to calculate an estimate for a specific query's performance under specific conditions.

Database physical design advisors evaluate physical design search spaces, often with regard to specific query plans or atomic query plans, but the evaluations do not consider a variety of runtime conditions (for example, resource availability). Furthermore, database physical design advisor comparisons are based completely on query optimizer cost estimates, as opposed to actual performance measurements of the system 100 depicted in FIG. 1.

Figure 4D:
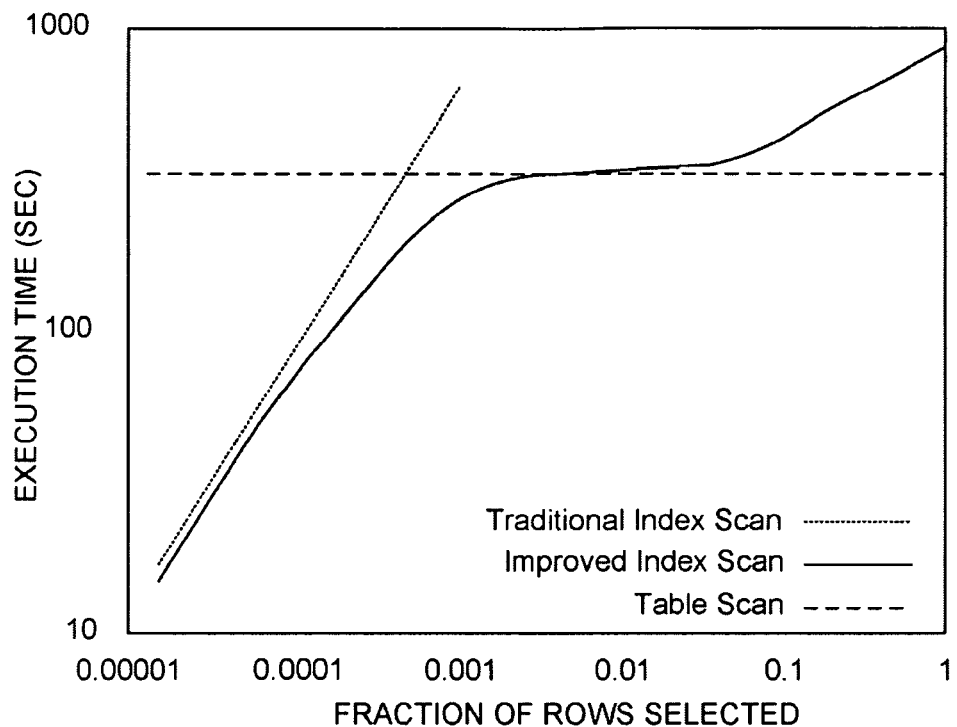

Referring to FIG. 4D, a diagram illustrates an example of a two-dimensional parameter space robustness table with single-table, single-predicate selection and shows execution times for selecting rows from a table (Transaction Processing Performance Council (TPC-H) benchmark line items, about 60M rows) for a variety of selectivities (result sizes). Selectivities and execution times both are shown with logarithmic scales. Query result sizes differ by a factor of two between data points. FIG. 4D shows performance of three query execution plans. One plan is a traditional table scan with performance constant across the entire range of selectivities. For small result sizes, the table scan is unacceptably slow compared to the index scans. A second plan is a traditional index scan, which is unacceptably slow for moderate and large result sizes due to the need to fetch qualifying rows from the table. Cost of the index scan is so high that showing the entire range of selectivities is not possible. The break-even point between table scan and traditional index scan is at about 30K result rows or $2^{-11}$ of the rows in the table. A third plan is an improved index scan which combines low latency for small results as well as high bandwidth for moderate result sizes. The cost of the improved index scan remains competitive with the table scan all the way up to about 4M result rows or $2^{-4}$ of the rows in the table. However, the improved index scan, despite improvement over the traditional index scan, has performance that is poor for large results. If all rows in the table satisfy the query predicate, the performance of the improved index scan is about 2½ times worse than a table scan. While a factor of 2½ is undesirable, cost is much less than cost of a traditional index scan which would exceed the cost of a table scan by multiple orders of magnitude.

An optimistic insight from FIG. 4D is that robust execution seems possible. A pessimistic insight is that the improved index scan as implemented in the system is not yet sufficiently robust. One perspective view is that a single query execution plan might eventually be superior or at least competitive across the entire range so that an erroneous choice during compile-time query optimization can be avoided by eliminating selection among alternatives. Another perspective view is that the query execution engine has not yet reached a sufficient level of sophistication and robustness. Considering the simple techniques that underlie the "improved" plan in FIG.

4D, appropriate run-time techniques can be used based on the usage of robustness maps analysis.

Although FIG. 4D can enable observations, insights, and perspective on a research effort, other visualizations enable additional insights into additional aspects of robustness and are helpful for individual operations such as index scans and for plan fragments such as scans of multiple indexes combined by index intersection. Visual images greatly assist in identifying poor scalability or robustness, discontinuities in actual execution costs, and the like. Thus, the further visualizations help in analyzing and reasoning about query execution algorithms, implementations, entire query execution plans or fragments thereof, and the query execution architecture.

The visualizations can be employed by database software vendors to target improvements in query execution, indexing techniques, and query optimization. The visualizations can be used by database administrators to analyze specific query execution plans to address unsatisfactory performance or robustness of query execution. Various visualizations have been found particularly helpful and are disclosed herein.

FIG. 4D is an example of a simple visualization of performance and robustness. One aspect of performance that can be verified by the two-dimensional diagram is that the actual execution cost is monotonic across the parameter space. For example, fetching of rows is expected to become more expensive with additional rows. If cases exist in which fetching more rows is cheaper than fetching fewer rows, some aspect of performance is anomalous. For example, the governing policy or some implementation mechanisms might be faulty in the algorithms that switch to pre-fetching large pages instead of fetching individual pages as needed. Moreover, the cost curve is expected to flatten, wherein the first derivative of the cost curve should monotonically decrease. Fetching more rows should cost more, but the difference between fetching 100 and 200 rows should not be greater than between fetching 1,000 and 1,100 rows, a condition that is not true for the improved index scan shown in FIG. 4D since the curve for the improved index scan shows a flat cost growth followed by a steeper cost growth for very large result sizes.

Figure 4E:
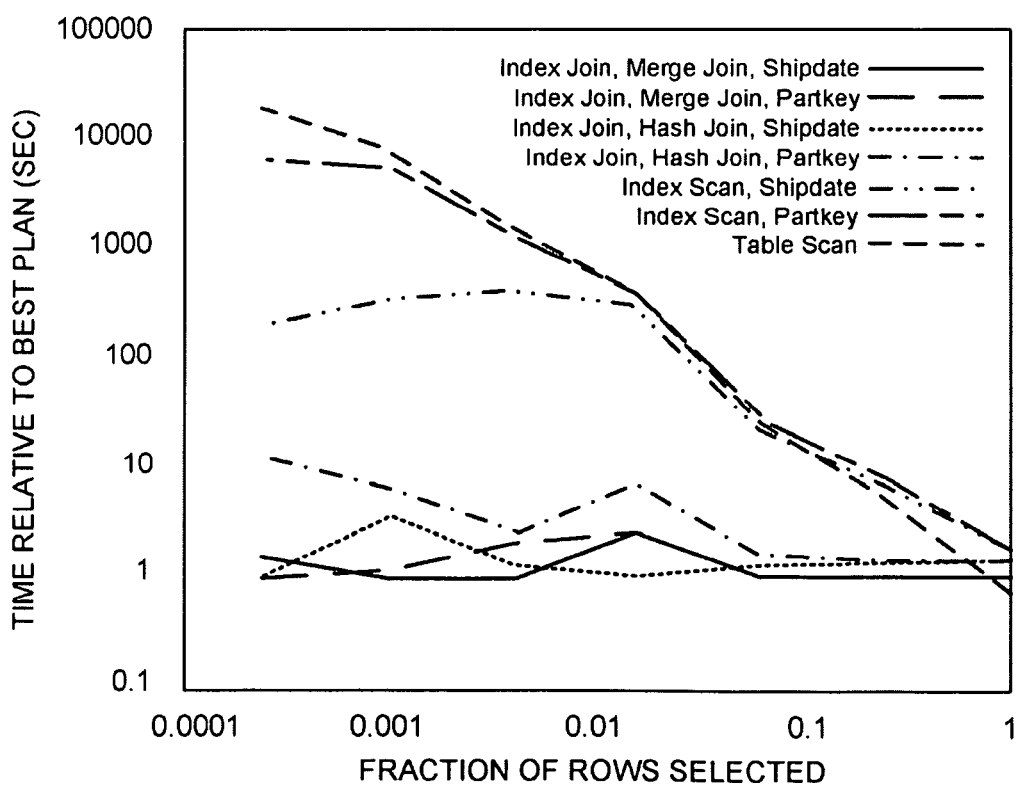

FIG. 4E is a diagram showing performance of plans for a simple query similar to the query of FIG. 4D, with two differences. First, performance is shown not in absolute times but relative to the best plan for each point in the parameter space. This type of diagram is most appropriate if the absolute performance varies very widely across the parameter space. In FIG. 4D for example, the left-most data point still represents an output size of about 900 rows ($60M \times 2^{-16}$). Even with a logarithmic scale for query execution costs, extending the diagram all the way to one output row would increase diagram height or reduce vertical resolution by a factor of 2½. Illustrating the relative performance of all plans may permit better resolution and better use of the space available for a diagram. Second, additional query execution plans are included, specifically multi-index plans that join non-clustered indexes such that the join result covers the query even if no single non-clustered index does. These index joins are performed by alternative join algorithms and using alternative join orders.

When comparing query execution plans for a given query, analysis includes determination of which classes of query execution plans to include such as: (1) only plans actually considered by the system under investigation; (2) plans that could be forced by some means or other including alternative syntax (for example, index intersection by means of multiple query aliases for the same database table); (3) plans that could be enabled only by an alternative database design (such as two-column indexes); or (4) plans that could be realized only with additional implementation effort by the software vendor (such as bitmap indexes, bitmap-driven sorting or intersection). Actual execution costs for the fourth class might be obtained through experiments using a competing database system that is more advanced in specific query execution techniques. The most appropriate class choice depends on whether design and future improvements of system components can be selected. For example, plans enabled by alternative syntax can considered if influence over the rewrite capabilities in the query optimization steps is available.

The diagrams can be implemented using either linear or logarithmic scales. Logarithmic scales on both axes permit reasonably detailed insight at both ends of the spectrum of possible parameter values. Curves can be formed to indicate absolute performance or performance relative to the best plan for any one point in the parameter space, where the definition for "best" might include any of the classes of query execution plans.

Robustness maps can also display performance in three-dimensional parameter spaces. Limitation to a single dimension within the parameter space both focuses and limits the insights. The interaction of dimensions can also be considered. The number of possible parameters may be very high, including multiple formal query parameters with run-time bindings; resource availability such as memory, processing bandwidth, I/O bandwidth, and interconnection bandwidth; and intermediate result sizes due to predicates (selection, joins), aggregation (projection, duplicate removal), and set operations (intersection, union, difference). Visualization practically forces consideration of two dimensions at a time and rotation through pairs of dimensions.

Figure 4F:
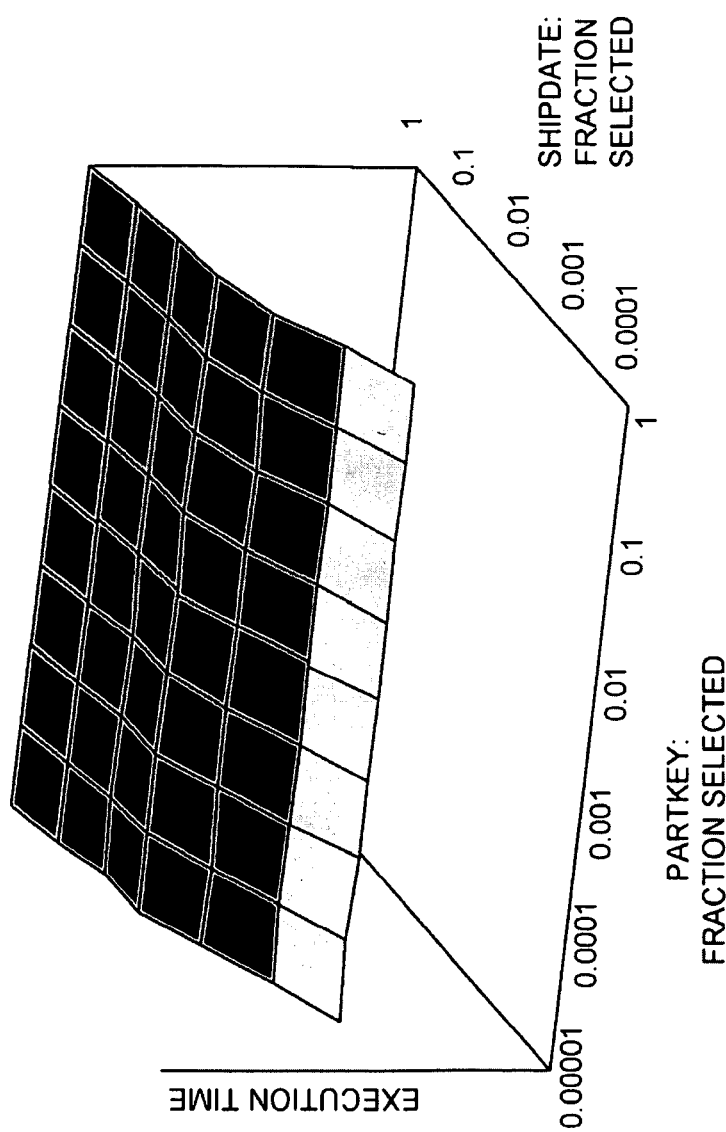

Referring to FIG. 4F, a three-dimensional map is shown which displays a parameter, illustratively execution time, in grayscale-coding or color-coding. The mapping shows elapsed times in colors or monochrome shades from green to red and finally black (light gray to black in monochrome) with each color or shade difference indicating an order of magnitude. FIG. 4F illustrates two-predicate, single-index selection, showing the execution cost for a query restricting two columns of a table. The query execution plan scans a single-column index and applies the second predicate only after fetching entire rows from the table's main storage structure. The two dimensions shown are the selectivities of the two predicate clauses. The third dimension is execution time, ranging from 4 seconds to 890 seconds.

As shown in FIG. 4F, the two dimensions have very different effects. In fact, one of the predicates appears to have practically no effect at all wherein the predicate can be evaluated only after fetching entire rows—a result which is predictable because index scans perform as expected and as coded in the cost calculations during query optimization. The actual behavior meets the anticipated behavior (reflected correctly in the cost function used during query optimization). FIG. 4F shows the robust query execution technology from FIG. 4D. While barely visible in FIG. 4F, FIG. 4D illustrates robustness very succinctly, demonstrating the value of visualizations using a combination of one-dimensional and two-dimensional parameter spaces.

Referring to FIG. 4G, a three-dimensional diagram illustrates operation of a two-index merge join, and shows the execution cost for an alternative query execution plan, specifically scans of two single-column non-clustered indexes combined by a merge join. Other than some measurement flukes in the sub-second range (front left, green), the symmetry in the diagram indicates that the two dimensions have very similar effects. Hash join plans perform better in some cases but do not exhibit symmetry.

Figure 4H:
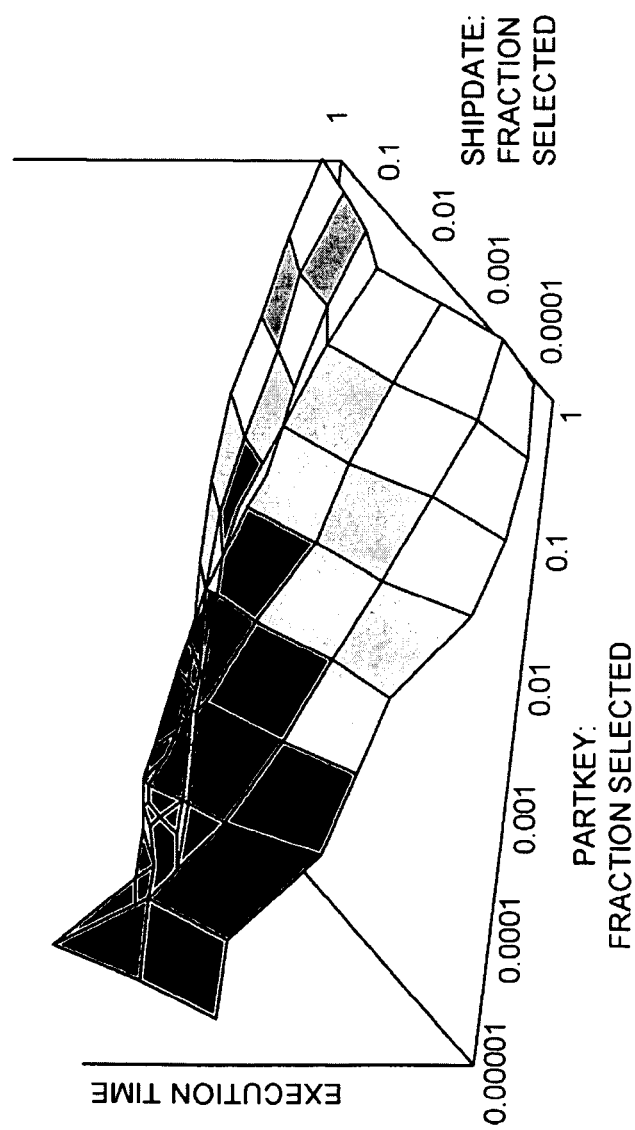

In addition to the two plans depicted in FIGS. 4F and 4G, FIG. 4H illustrates a map acquired by running five additional alternative query execution plans for the simple query. The query execution plans include a no-index table scan (actually, scanning a clustered index organized on an entirely unrelated column), a plan using a single-column non-clustered index for the other predicate clause, and three other plans combining two single-column non-clustered indexes (using merge join or hash join each in two join orders). The relative performance of each individual plan is plotted compared to the optimal plan at each point in the parameter space. A given plan is optimal if performance is equal to the optimal performance among all plans, so that the quotient of costs is 1. A plan is sub-optimal if the quotient is much higher than 1.

Referring to FIG. 4H, a three-dimensional diagram depicts performance of a single-index can relative to the best of seven plans. FIG. 4H shows the same data as FIG. 4F with performance indicated in terms of the relative difference to the best plan at each point. The diagram enables immediate recognition that the plan is optimal only in a small part of the parameter space. Moreover, the region is not continuous. While the absolute performance shown in FIG. 4F is fairly smooth, the relative performance shown in FIG. 4H is not smooth indicating that the costs of best plans are not smooth. In the example, the maximal difference is a factor of 101,000. Thus, while the plan is optimal in some regions of the parameter space, the worst relative performance is so poor that disruption of data center operation is likely.

Figure 4I:
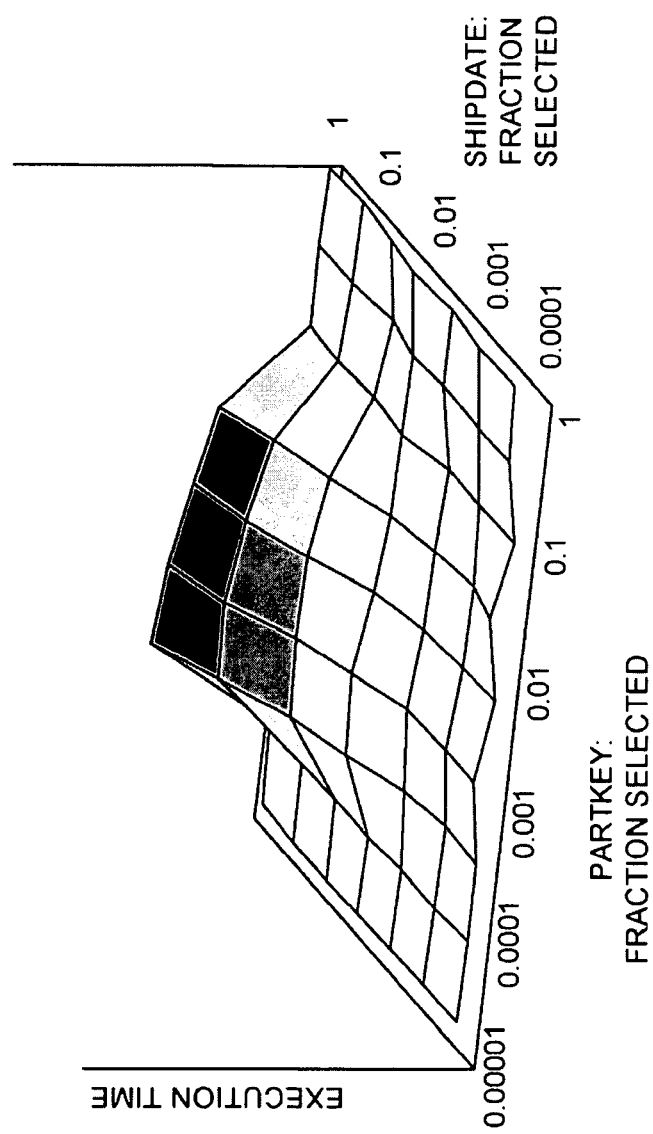

Referring to FIG. 4I, a three-dimensional diagram illustrates relative performance of a system using a two-column index, depicting the relative performance of a plan with a covering two-column index in an a software system different from that analyzed with respect to FIG. 4H. Due to multi-version concurrency control applied only to rows in the main table, the plan involves fetching full rows. In other words, the space overhead of multi-version concurrency control seems to have forced the developers of the system to apply concurrency control only to rows in the main representation of the table. Thus, the advantages of covering non-clustered indexes, including joins of multiple non-clustered indexes are disabled.

In the query execution plan, rows to be fetched are sorted very efficiently using a bitmap. The plan is close to optimal in this system over a much larger region of the parameter space. Moreover, the plan's worst quotient is not as bad as that of the prior plan shown in FIG. 4H. Thus, if the actual value of parameters is not known at compile-time, the plan is probably much more desirable even if the plans of FIG. 4F and FIG. 4G are judged more efficient at compile-time based on anticipated predicate selectivities. Thus, robustness might well trump performance in those situations.

Figure 4J:
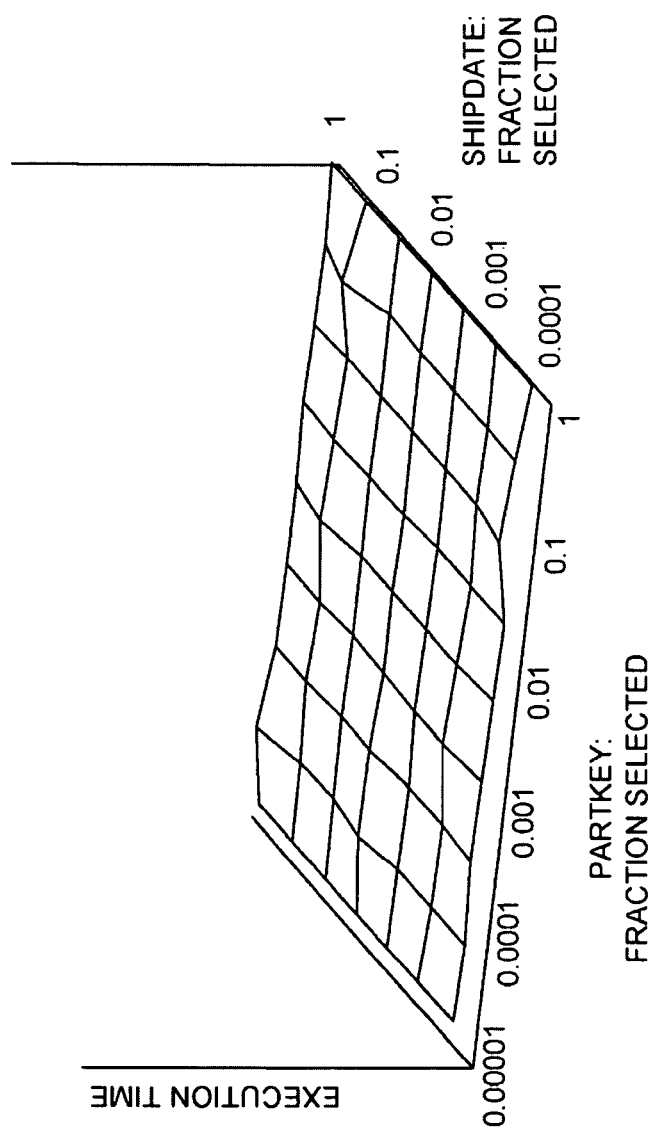

Referring to FIG. 4J, a three-dimensional robustness map shows the most robust plan in a third system. Relative performance is good across the entire parameter space, albeit not optimal. The foundation of consistent performance is a sophisticated scan for multi-column indexes described as multi-dimensional B-tree access. Data points indicate that the plan is the best query execution plan (indicated by a cost factor 1 or a light green color or light monochrome shade).

The visualization techniques employed to form the diagrams enable rapid verification of expected performance, testing of hypotheses, and insight into absolute and relative performance of alternative query execution plans. For even a very simple query, a plethora of query execution plans can be used. Investigating many plans over a parameter space with multiple dimensions is possible only with efficient visualizations.

Other robustness maps can be created to analyze other aspects of performance. For example, worst performance can be mapped to detect particularly dangerous plans and relative performance of plans compared to worst possible performance. In addition, multiple systems and available plans can be compared in combination.

Other software development activities can be performed on the basis of the visualizations. For example, a developer can focus on improving the performance of the best plan at some points deemed important within the parameter space—a traditional focus on achievable performance. Also, a developer can focus on performance of the plan with the broadest region of acceptable performance and then improve performance in the regions of the parameter space where the plan's performance is poor—a focus on robustness of a specific plan and, if that plan is chosen during query optimization, on robustness of query processing as a whole.

Another robustness map visualization is a single map showing all possible query execution plans, indicating the best plan for each point and region in the parameter space, perhaps using a color for each plan. One aspect of the map can be the size and the shape of each plan's optimality region. The regions can be continuous, simple shapes.

For query execution, analysis can focus on irregular shapes of optimality regions. Often, some implementation idiosyncrasy rather than the algorithm can cause the irregular shape. Removal of such idiosyncrasies may lead to more efficient as well as more robust query execution.

Some techniques can enlarge the largest region, possibly even eliminating some smaller regions and thus some plans from the map of optimality. Every plan eliminated from the map implies that query analysis need not consider the eliminated plan. Reducing the plan space in query analysis contributes to the robustness.

Figure 4K:
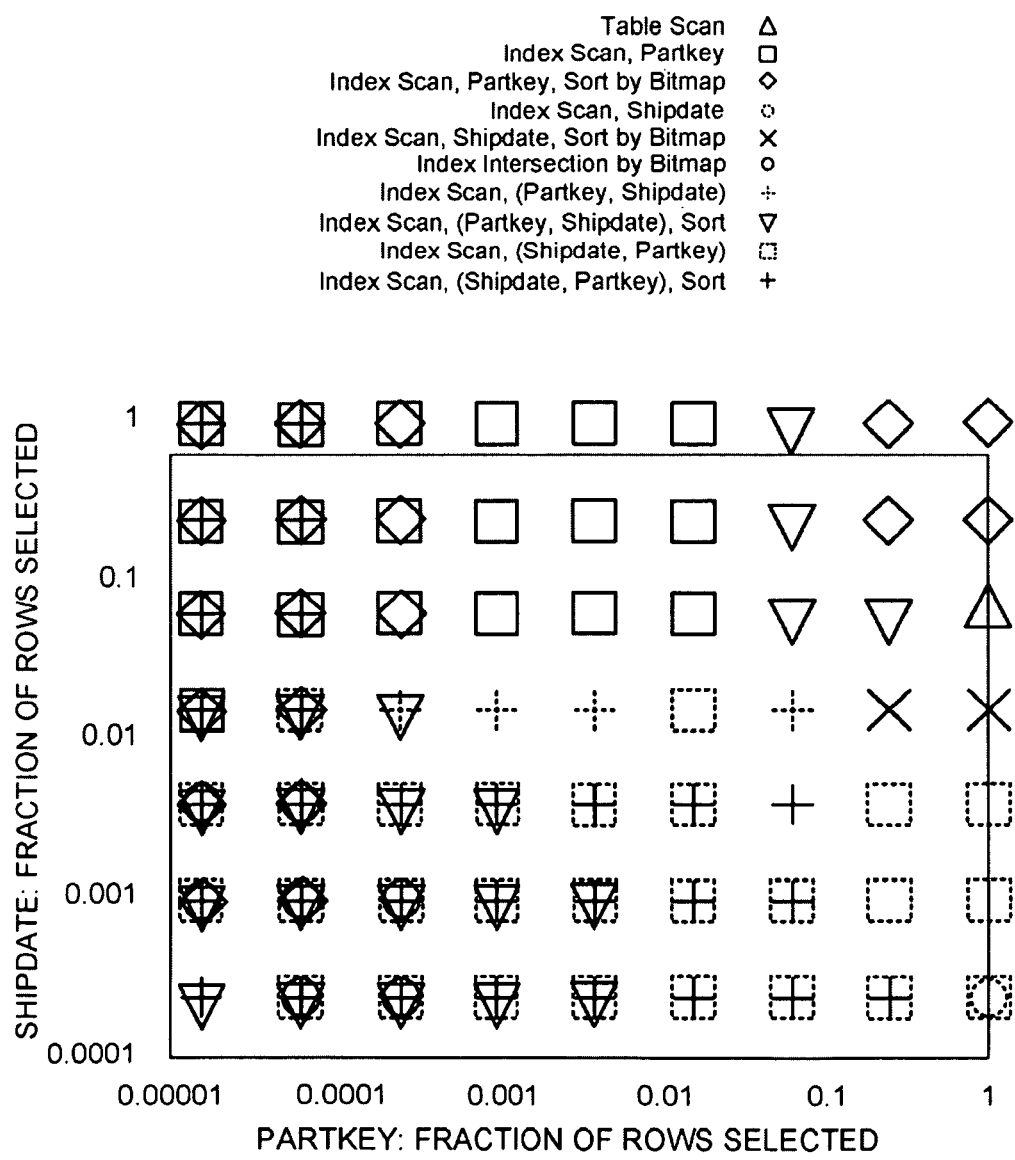

Referring to FIG. 4K, a diagram, shows mapping of regions of optimality. Most points in the parameter space have multiple optimal plans (within 0.1 sec measurement error). In fact, when analyzing optimality, all small differences should be neglected. For example, two plans with actual execution costs within 1% of each other are practically equivalent. Whether the tolerance ends at 1% difference, at 20% difference, or at a factor of 2 depends on a tradeoff between performance and robustness, and thus the tradeoff between the expense of system resources and the expense of human effort for tuning and problem resolution.

Variants of FIG. 4I and FIG. 4J can be used to show the region of optimality for a specific plan. Since the number of plans that may cover any one point in the parameter space is large, shading using two colors is typically not sufficient, but a diagram with points shaded in a large number of colors seems more confusing than illuminating. Thus, this type of diagram inherently requires one diagram per plan and thus many diagrams.

FIGS. 4L(1) and 4L(2) illustrate robustness maps for two-predicate index scan implementations. Robustness maps are designed to quantify and visualize how performance degrades as work increases and resources decrease. A plan or operator under test is fixed and performance is measured while forcing execution across a spectrum of conditions with results then plotted in a Euclidean space. The resulting shape illustrates performance degradation patterns. Slope indicates how quickly performance degrades, while curvature indicates how predictably performance degrades. Areas where the rate of performance rapidly and unpredictably drops are manifest. For example, FIGS. 4L(1) and 4L(2) compare three-dimensional robustness maps for two different implementations of a given operator, charting performance of an index scan while varying the selectivity of two predicates. Other robustness maps can be used to show how a given plan's performance compares to that of the best plan. Although only two- and three-dimensional maps are depicted herein, the technique can be used with any metric space.

Robustness maps enable analysis and reasoning about the executor's impact on query robustness. By making visible where and how performance changes, the maps show developers and regression testers the circumstances under which performance is particularly sensitive to small deviations from expected conditions. Developers can then address this sensitivity. Robustness maps thus enable a different view of performance than tests that focus on pure execution time or throughput. Robustness maps enable motivation, tracking, and protection of improvements in query execution by providing a concrete and intuitive "big picture" of the performance landscape.

The robustness map approach can be tested by building robustness maps for simple queries from the TPC-H benchmark. All database instances can be loaded with the same line item table, using the same rows (in the same order). A scale factor 10 instance of TPC-H can be used resulting, for example, in 60M rows (6 GB). In an example analysis, five indexes are built upon the table including a default clustered index on the primary key, two single column indexes on the query predicate columns, and a pair of two-column indexes on the query predicate columns. A selected number of maps are constructed and analyzed for the three systems. For example, FIGS. 4L(1,2) show that one implementation of index nested loops join is more resilient than another to variance in input data sizes, a graceful degradation that may result from the first implementation's efficient sort operation.

Figure 4M:
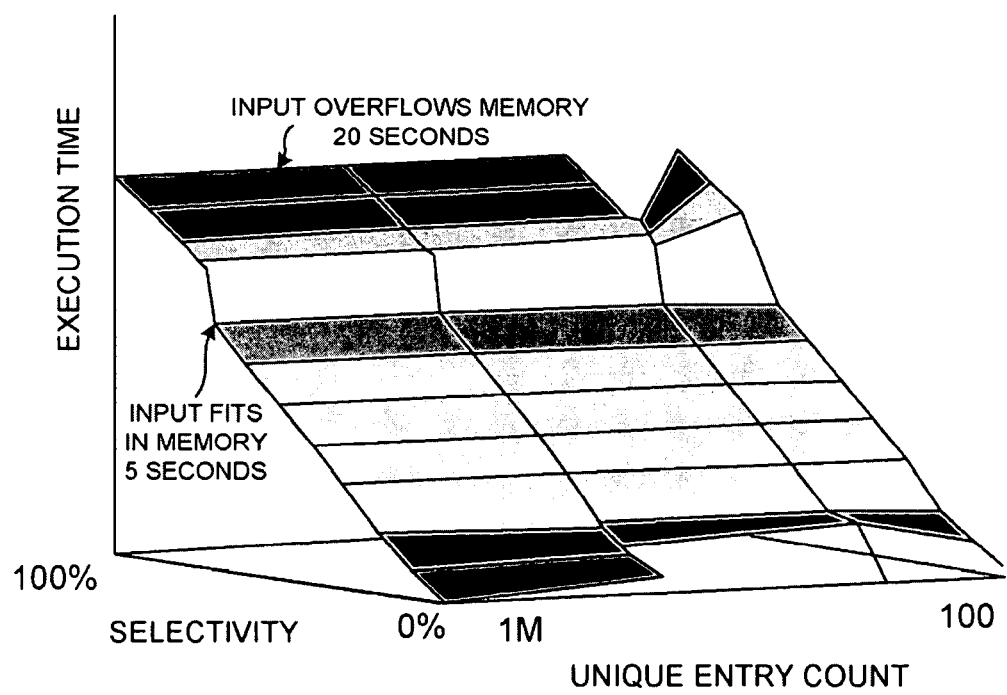

Thus robustness maps can be used to evaluate the robustness of the commercial system B sort operator. FIG. 4M shows a three-dimensional robustness map comparing the relative performance of the sort operator while varying selectivity and duplicate values. A dramatic drop in performance occurs when the data input no longer fits in memory. If estimated selectivity were one row short of the amount that would fit into memory, and the actual data size only two rows more, the sort operation would take nearly five times longer than expected.

Figure 4N:
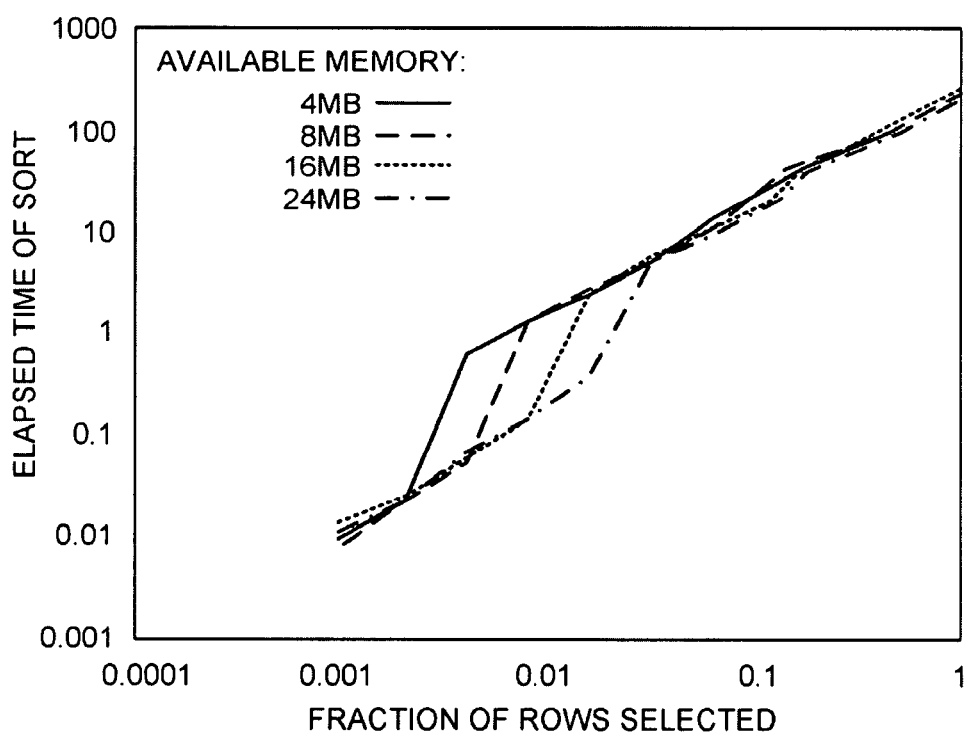

Although such a performance drop or cliff could be considered easily anticipated, since memory availability and cardinality estimates can be checked at compile-time, when the plan is selected. However, a query optimizer bases cost estimates for a sort operation on the amount of configured memory and initial cardinality estimates, both of which are subject to significant change from compile time to run-time. Resource contention can reduce the amount of available memory to a small fraction of that anticipated. Multiple levels of intermediate results can compound that impact. FIG. 4N maps how performance degrades as available memory decreases and shows how memory contention changes the location of the critical point where a small increase in data size causes a major drop in performance.

Run-time performance of any query plan can vary dramatically depending on execution conditions such as actual predicate selectivity and contention for memory and other resources. Execution conditions vary unpredictably, leading to the unexpectedly long-running queries that plague database users and administrators today. Thus, robust query processing reduces cost of ownership by reducing the need for human intervention.

In general, robustness in database query processing can be improved by modifications in query optimization, query execution, workload management, and other components.

The systems and techniques disclosed herein focus on query execution. Robustness maps can be used to visualize performance of query execution algorithms and plan fragments, enabling understanding of behavior across a wide range of unexpected situations.

Various visualization techniques reveal different insights. Robustness maps with two- and three-dimensional parameter spaces are introduced, including discussion of robustness map interpretation, a demonstration of how to detect landmarks that appear on the maps, and a discussion of implications for robustness.

Visualizing the performance of specific algorithms, associated implementations, and plan fragments using the algorithms enables analysis of strengths and weaknesses. Adaptive techniques during run-time query execution can have as great an impact on robust query processing as plan choices during compile-time query optimization. Adaptive run-time techniques pertain to data volumes, resource availability including memory, and the specifics of the memory hierarchy.

Robustness map analysis and its visualization can be extended to additional query execution algorithms including sort, aggregation, join algorithms, and join order. For example, some implementations of sorting spill their entire input to disk if the input size exceeds the memory size by merely a single record. Those sort implementations lacking graceful degradation will show discontinuous execution costs. Other resources may introduce similar effect, such as a sort input exceeding the size of the CPU cache or the size of flash memory.

Robustness maps enable visualizations of entire query execution plans including parallel plans. A benchmark can be defined that focuses on robustness of query execution and, more generally, of query processing. The benchmark can be used to identify weaknesses in the algorithms and implementations, track progress against weaknesses, and permit daily regression testing to protect the progress against accidental regression due to other, seemingly unrelated, software changes.

Figure 5:
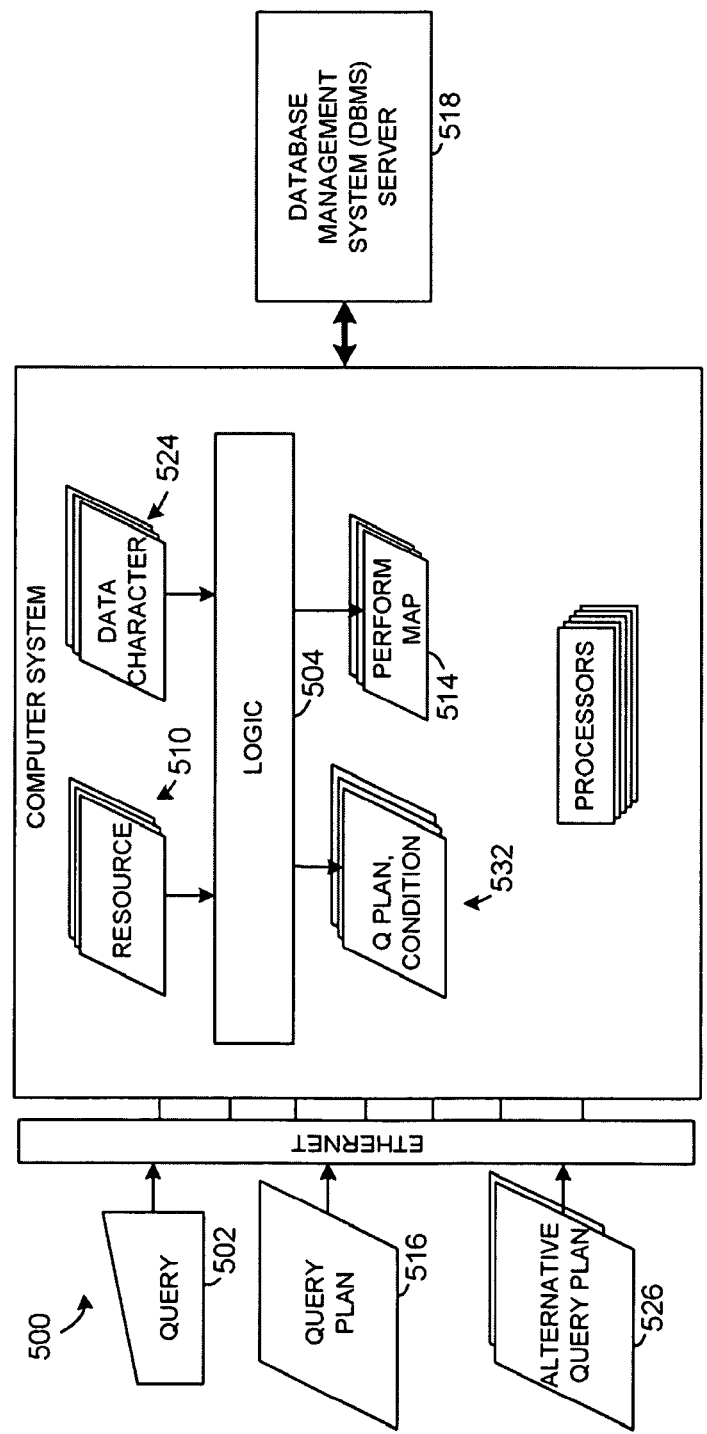
FIG. 5 is a schematic block diagram showing an embodiment of a computer-implemented system that evaluates query plan robustness and produces a map of relative performance of the given query plan when compared with alternative plans for a range of conditions.

Referring to FIG. 5, a schematic block diagram shows an embodiment of a computer-implemented system 500 that evaluates query plan robustness and produces a map 514 of relative performance of the given query plan 516 when compared with alternative plans 526 for a range of conditions. The computer-implemented system 500 comprises logic 504 that evaluates database performance of a selected query plan 516 and at least one alternative query plan 526. The logic 504 creates a set of performance maps 514 that compare performance of a selected database system 518 operating according to the selected query plan 516 and operating according to the one or more alternative query plans 526 under actual conditions. The logic 504 measures and maps performance of the selected query plan 516 relative to the one or more alternative query plans 526 in a predetermined range of runtime conditions that include data characteristics and/or other conditions such as resource availability.

In some embodiments, the system 500 can further comprise a target query plan 516 to be evaluated, a set 510 of runtime resource conditions under which the query 516 is to be evaluated, and a set 524 of data characteristics.

The logic 504 executes a query 502 using the target query plan 516 and using the one or more alternative query plans 526, and measures multiple performance characteristics for selected runtime resource conditions at multiple data characteristics. The logic 504 creates a set 532 that includes the query plan, conditions, and performance measurements.

The logic 504 can identify regions in the one or more performance maps 514 for which performance using the target query plan 516 degrades more than a selected amount in comparison to performance using the one or more alternative query plans 526. The logic 504 collects the identified regions, identifies coordinates in the arrangement of the identified regions as landmarks, and creates a performance map 514 of query plan performance that includes landmark coordinates in terms of cardinality, resource conditions, and comparative performance of the target query plan 516.

Figure 6:
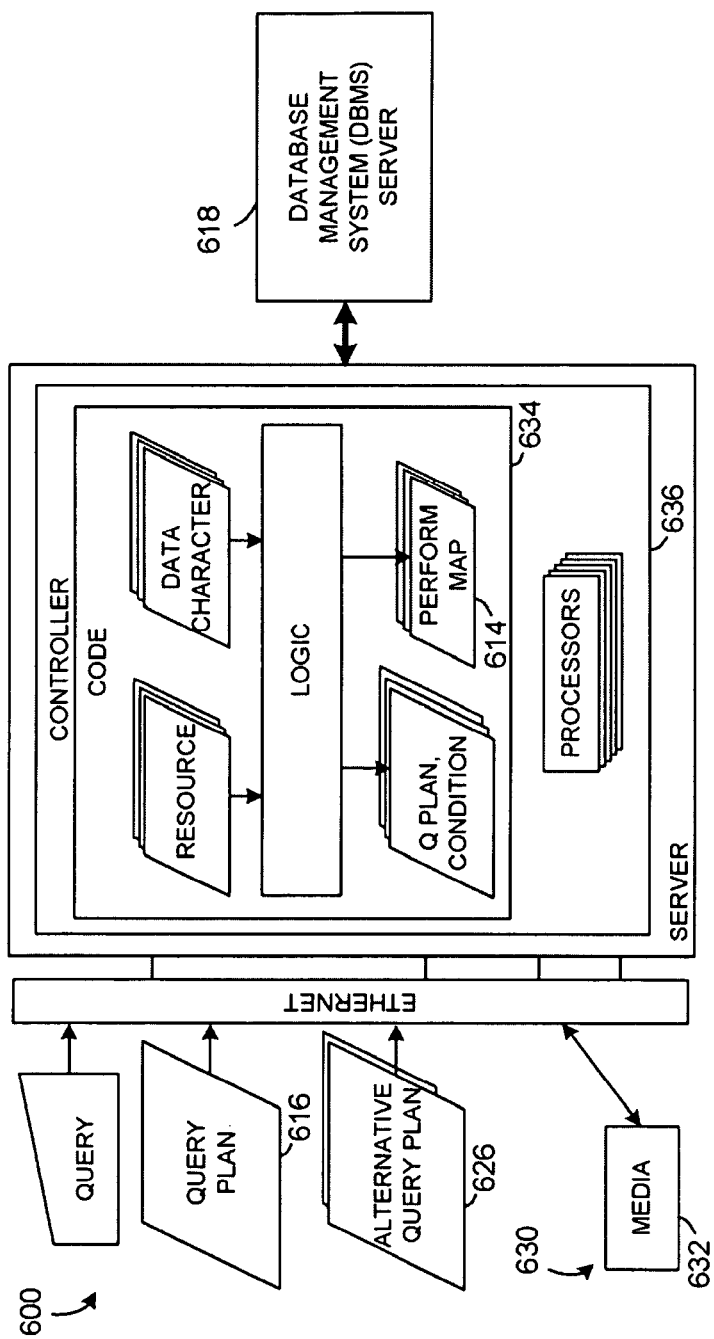
FIG. 6 is a schematic block diagram illustrating an embodiment of a computer-implemented system in the form of an article of manufacture that evaluates query plan robustness and produces a map of relative performance of the given query plan when compared with alternative plans for a range of conditions.

Referring to FIG. 6, a schematic block diagram illustrates an embodiment of a computer-implemented system 600 in the form of an article of manufacture 630 that evaluates query plan robustness and produces a map 614 of relative performance of the given query plan 616 when compared with alternative plans 626 for a range of conditions. The article of manufacture 630 comprises a controller-usable medium 632 having a computer readable program code 634 embodied in a controller 636 for evaluating database performance of a selected query plan 616 and one or more alternative query plans 626. The computer readable program code 634 comprises code causing the controller 636 to create a set of performance maps 614 comparing performance of a selected database system 618 operating according to the selected query plan 616 and operating according to the one or more alternative query plans 626 under actual conditions. The computer readable program code 634 further comprises code causing the controller 636 to measure and map performance of the selected query plan 616 relative to one or more alternative query plans 626 in a predetermined range of runtime conditions that include data characteristics.

Referring to FIGS. 7A and 7B, flow charts illustrate one or more embodiments or aspects of a computer-executed method for evaluating robustness of a query plan by measuring performance with regard to a range of runtime conditions and producing a map of relative performance of the given query plan when compared with alternative plans for a range of conditions. FIG. 7A depicts a computer-executed method 700 for analyzing database queries comprising evaluating 702 a selected query plan in comparison to a plurality of alternative query plans in a predetermined range of runtime conditions comprising data characteristics. A set of performance measurements are produced 704 and the measured performance is analyzed 706 to map performance of the selected query plan in comparison to performance of at least one alternative query plan.

Referring to FIG. 7B, a method 710 for evaluating robustness of a query plan can comprise evaluating 712 database performance of a selected query plan and one or more alternative query plans, and creating 714 a set of performance maps comparing performance of a selected database system operating according to the selected query plan and operating according to the at least one alternative query plan under actual conditions. The method 710 can further comprise measuring and mapping 716 performance of the selected query plan relative to the at least one alternative query plan in a predetermined range of runtime conditions comprising data characteristics.

Terms "substantially", "essentially", or "approximately", that may be used herein, relate to an industry-accepted tolerance to the corresponding term. Such an industry-accepted tolerance ranges from less than one percent to twenty percent and corresponds to, but is not limited to, functionality, values, process variations, sizes, operating speeds, and the like. The term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. Inferred coupling, for example where one element is coupled to another element by inference, includes direct and indirect coupling between two elements in the same manner as "coupled".

The illustrative block diagrams and flow charts depict process steps or blocks that may represent modules, segments, or portions of code that include one or more executable instructions for implementing specific logical functions or steps in the process. Although the particular examples illustrate specific process steps or acts, many alternative implementations are possible and commonly made by simple design choice. Acts and steps may be executed in different order from the specific description herein, based on considerations of function, purpose, conformance to standard, legacy structure, and the like.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims.

What is claimed is:

1. A computer-implemented system comprising:

a processor; and logic stored in memory, the logic executable by the processor to evaluate a selected query plan in comparison to a plurality of alternative query plans over a predetermined range of runtime conditions comprising data characteristics, the logic via the processor producing a set of performance measurements and analyzing the measured performance to map performance of the selected query plan in comparison to performance of at least one alternative query plan over the predetermined range of runtime conditions, wherein the logic via the processor identifies landmarks at specific runtime conditions indicative of selected query plan performance that is degraded greater than a selected amount in comparison to an alternative query plan performance.

2. A computer-implemented system comprising:

a processor; and logic stored in memory, the logic executable by the processor to evaluate a selected query plan in comparison to a plurality of alternative query plans over a predetermined range of runtime conditions comprising data characteristics, the logic via the processor producing a set of performance measurements and analyzing the measured performance to map performance of the selected query plan in comparison to performance of at least one alternative query plan over the predetermined range of runtime conditions; and an interface for receiving a query, a target query plan, and a set of runtime resource conditions to be evaluated, wherein the logic via the processor generates and collects alternative query plans for the query, comprising:

iterating through the runtime conditions and, for sets of runtime conditions, iterating through the target query plan and alternative query plans comprising running the query under the specified conditions while collecting the alternative query plans generated by a query optimizer; and measuring and collecting performance results of the query runs.

3. The system according to claim 2, wherein the logic via the processor compares performance of the selected query plan to performance of a determined best alternative query plan for selected sets of conditions.

4. A computer-implemented system comprising:
a processor;
logic stored in memory, the logic executable by the processor to evaluate database performance of a selected query plan and at least one alternative query plan over a predetermined range of runtime conditions comprising data characteristics, the logic via the processor creating a set of performance maps comparing performance of a selected database system operating according to the selected query plan and operating according to the at least one alternative query plan under actual conditions, the logic via the processor measuring and mapping performance of the selected query plan relative to the at least one alternative query plan over the predetermined range of runtime conditions comprising data characteristics;

a target query plan to be evaluated;
a set of runtime resource conditions under which a query is to be evaluated; and
a set of data characteristics, wherein the logic via the processor executes the query using the target query plan and using the at least one alternative query plan, and measures a plurality of performance characteristics for selected runtime resource conditions at a plurality of data characteristics, the logic via the processor creating a set comprising the respective query plan, conditions, and performance measurements, and wherein the logic comprises a query optimizer that generates via the processor the at least one alternative query plan, wherein the logic via the processor identifies regions in at least one performance map for which performance using the target query plan degrades more than a selected amount in comparison to performance using the at least one alternative query plan, the logic via the processor collecting the identified regions, identifying coordinates in the arrangement of the identified regions as landmarks, and creating a performance map of query plan performance that includes landmark coordinates in terms of cardinality, resource conditions, and comparative performance of the target query plan.

* * * * *